United States Patent [19]
Logan

[11] 3,921,458
[45] Nov. 25, 1975

[54] ISOKINETIC SAMPLING PROBE

[75] Inventor: Forrest E. Logan, Claremont, Calif.

[73] Assignee: Occidental Petroleum Corporation, Los Angeles, Calif.

[22] Filed: Mar. 1, 1974

[21] Appl. No.: 447,212

[52] U.S. Cl. .......................... 73/422 R; 73/421.5 R
[51] Int. Cl.² ......................................... G01N 1/22
[58] Field of Search .......... 73/28, 421.5 A, 421.5 R, 73/422 R

[56] References Cited
UNITED STATES PATENTS

| | | | |
|---|---|---|---|
| 2,363,625 | 11/1944 | Swearingen | 73/422 R |
| 2,376,542 | 5/1945 | Kimmell | 73/422 R |
| 2,452,224 | 10/1948 | Collett, Jr. | 73/421.5 R |
| 2,650,497 | 9/1953 | Renwanz | 73/422 R X |

OTHER PUBLICATIONS

Brady, William and L. A. Touzalin, Determination of Dust in Blast–Furnace Gas, in Journal of Industrial and Engineering Chemistry, Sept. 1911, pp. 662–670.

Primary Examiner—Richard C. Queisser
Assistant Examiner—John S. Appleman
Attorney, Agent, or Firm—Christie, Parker & Hale

[57] ABSTRACT

A fluid sampling probe system consists of circularly arcuate tube having a first end to be disposed outside a conduit through which fluid travels along a flow path, and a second end disposed inside the conduit at or near its center in a plane aligned to the flow path of the fluid and substantially parallel thereto. The second end of the tube faces the path of fluid flow for accurate sampling of the fluid with minimal disturbance to flow. The first end of the tube is connectible to sampling means capable of withdrawing fluid from the conduit at the same linear velocity of the fluid flowing through the conduit. A supporting sleeve is attached to the conduit by an external weld joint where the tube enters the conduit and acts in cooperation with a combined seal to seal the probe against leakage, control the extension of the probe into the conduit as well as align it with the axial path of flow of fluid through the conduit for accurate sampling of the fluid composition.

6 Claims, 4 Drawing Figures

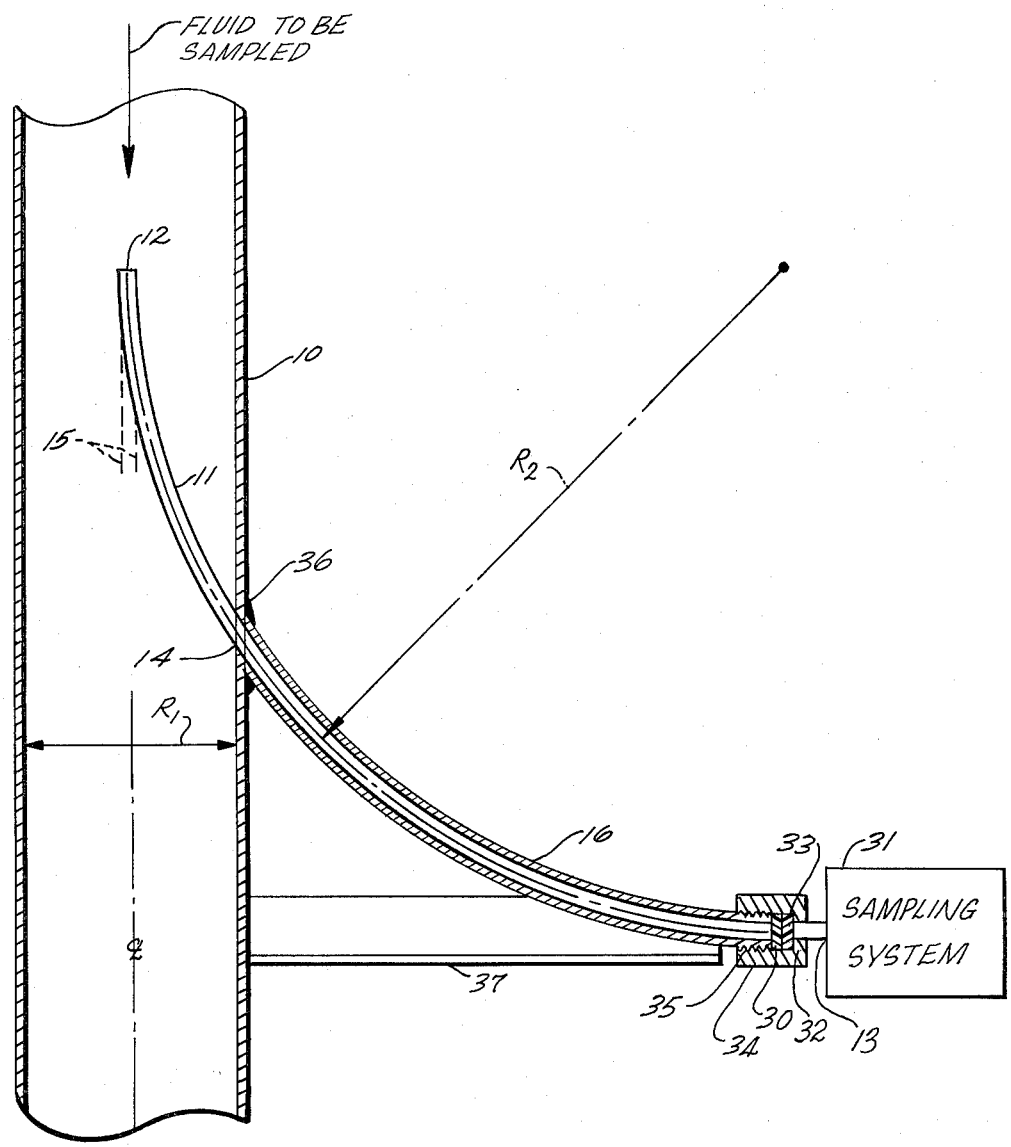
Fig.1
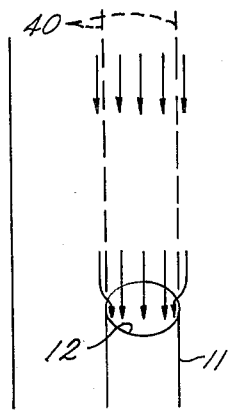
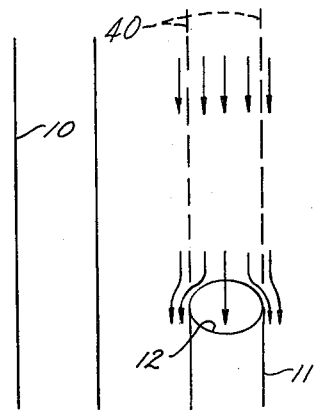
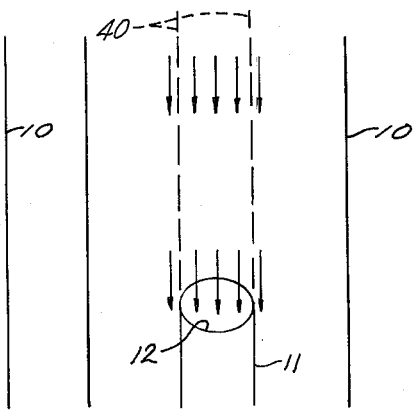

3,921,458

ISOKINETIC SAMPLING PROBE

BACKGROUND OF THE INVENTION

This invention relates to an improved sampling probe for sampling fluids passing through a conduit.

It is difficult to sample a fluid without disturbing the condition or composition of a fluid flow system. Any disturbance may have adverse effects on the system composition and prevent the extraction of a truly representative sample of the fluid. Further, a sampling system may also be encumbered when it contains particulate material at a high temperature such as residual char particles from pyrolysis operations.

SUMMARY OF THE INVENTION

According to the invention, there is provided an elongated sampling probe for sampling the composition of a fluid flowing through a fluid flow conduit which consists of a circularly arcuate conduit having a first end disposed outside the fluid flow conduit and adapted to be connected to a fluid sampling system and a second end disposed inside the fluid flow conduit at or near its center in a plane aligned with the path of the fluid flow and substantially parallel to the axis of fluid flow. The portion of the tube outside the conduit is surrounded by a conforming supporting circularly arcuate sleeve which serves to accurately position the second end of the tube within the conduit and to prevent rotation of the probe relative to the axis of fluid flow. The sleeve is normally attached to the conduit by an external weld joint where the tube contacts the conduit and there may be provided a supporting beam which extends from the conduit to the sleeve. Conventional seal means, such as, for example, compression type tube fittings is provided to prevent fluid leakage from the sleeve.

A fluid sampling means such as a suction pump may be connected to the first end of the tube to withdraw fluid from the conduit through the tube at the same linear velocity as the linear velocity of fluid flow through the conduit. As a result, very little disturbance of the fluid flow conditions within the conduit occurs since the point of sampling occurs upstream from any disturbance which may occur. Further, the use of an outside weld on the conduit for the sleeve reduces the possibility of particle accumulation should the stream being sampled contain solid particles such as char, residual pulverized coke and the like resulting from a pyrolysis operation from which sampling is made. Preferably the radius of the curvature of the semi-circular tube is at least 5 times the interior width of the conduit.

BRIEF DESCRIPTION OF THE DRAWING

The features of a specific embodiment of the best mode contemplated of carrying out the invention are illustrated in the drawing, in which:

FIG. 1 is a side partially sectional view of a fluid flow conduit in which a sampling probe embodying the principles of the invention is inserted; and FIGS. 2A, 2B and 2C are diagrams illustrating the effect of different relative linear velocities between conduit and probe.

DETAILED DESCRIPTION OF THE SPECIFIC EMBODIMENT

In FIG. 1, not drawn to scale, a conduit 10 is part of a fluid flow system in which the fluid is to be sampled for the purpose of determining its composition. The fluid may be, for instance, part of a pyrolytic process for coal or organic waste conversion in which there is particulate solids in the carrier fluid. An example is a substantially gaseous stream containing volatilizable hydrocarbons produced by pyrolysis with some residual char at a temperature of about 1500°F.

This fluid has a flow path through conduit 10 in the direction of the arrow in FIG. 1. A circularly arcuate section of a hollow probe 11 has an inlet end 12 disposed inside conduit 10, and an outlet or sampling end 13 disposed outside conduit 10. As illustrated in FIG. 1, end 12 of probe 11 is positioned approximately at or on the center line of conduit 10 and in a plane transverse to the path of fluid flow to align the inlet end 12 of tube 11 to the flowing fluid and to minimize the disturbance of the fluid conditions at the point of sampling. The inlet end 12 is substantially co-axial with the longitudinal axis of the tube 10. From end 12, tube 11 extends through the side wall of conduit 10 where it exits at point 14. The curvature of the portion of tube 11 inside conduit 10 is such that it presents a profile to fluid flow that approximates the profile of a straight tube substantially aligned with the path axis of the fluid flow.

For the purposes of comparison a straight tube is depicted in FIG. 1 by phantom lines 15. The profile bend of tube 11 transverse to fluid flow lies at point 14, which is relatively far removed from the inlet end 12 where the fluid is sampled. As a result, the major portion of the disturbance of the flow conditions caused by tube 11 takes place downstream of the sampling point 12. For best results, the ratio of the diameter $R_1$ of conduit 10 to the radius $R_2$ of curvature of the circularly arcuate section sampling tube 11 is 1:5 or greater.

In other words, if conduit 10 is circular having a one inch diameter, the circularly arcuate section of tube 11 would have at least about a 5 inch radius to achieve maximum extension. End 12 preferably lies in a plane of the conduit 10 perpendicular to the axis of conduit 10; the plane intersecting the locii 15 of radius $R_2$. This ensures that the tube 11 minimizes disturbance of the fluid flowing in conduit 10, thus assuring that a sample which is an accurate representation of composition of the fluid can be collected.

Secured to the outside conduit 10 is a supporting sleeve 16 which conforms to the configuration of probe 11. Probe 11 is slidable relative to supporting sleeve 16. To install probe 11 in conduit 10, probe 11 is slid through sleeve 16 until a stop such as flange 33 on probe 11 abuts against the inlet end of sleeve 16. This determines the extent of penetration of probe 11 into conduit 10, and thus assures the correct positioning of end 12 of probe 11 within conduit 10 with respect to its center line while sleeve 16 prevents rotation of probe 11 to ensure end 12 will always lie in the conduit plane perpendicular to fluid flow. If desired, sleeve 16 may also be heated and/or insulated to prevent the sampled fluid from being cooled before analysis. At point 14 where probe 11 enters conduit 10, sleeve 16 is attached to conduit 10 by an external weld joint 36 which serves as the first fluid seal. Since joint 36 is outside conduit 10, rather than inside, there is no external extraneous obstruction within conduit 10 to collect particulate or other agglomerative materials.

A seal, such as washer 30, is sandwiched between the flange 33 or a similar stop means on probe 11 at the end of sleeve 16 with the seal being perfected by lock nut 34. A nut 34 has a threaded connection 35 for the threaded end of sleeve 16. As nut 34 is threaded onto sleeve 16, the end 32 of nut 34 bears flange 33 and washer 30 against the end of sleeve 16, thereby establishing a gas tight seal connection between tube 11 and sleeve 16. When probe 11 is thus assembled, it is prevented by the curvature of sleeve 16 from rotating away from its correct position in conduit 10. Sleeve 16 may be attached to conduit 10 by a supporting beam 37. Beam 37 extends transversely from the length of conduit 10 to about the end of sleeve 16. At one end, beam 37 is welded to conduit 10, and at the other end, it is welded to sleeve 16.

In summary, sleeve 16, joint 36, and beam 37 provide for probe 11 a means of support and attachment to conduit 10 that presents no obstructions in the flow path within conduit 10 and positions end 12 precisely inside conduit 10 without an opportunity to move.

The sampling system 31, such as a suction pump, draws fluid from conduit 10 through probe 11 so that the mass velocity of the carrier gas, i.e., the mass flow rate per unit cross-sectional area, through probe 11 is identical to the mass velocity of the carrier gas through conduit 10. As a result, the fluid sample flowing through probe 11 is truly representative of the composition of the fluid flowing through conduit 10.

In FIGS. 2A, 2B and 2C, conduit 10 and probe 11 are depicted schematically, and phantom lines 40 represent an imaginary projection of probe 11 upstream of end 12. FIG. 2A represents the case in which too much fluid from conduit 10 is drawn into probe 11 by sampling system 31. Some of the fluid flowing outside the upstream projection of probe 11 is drawn into probe 11. FIG. 2B represents the case in which too little fluid from conduit 10 is drawn into tube 11 by sampling system 31. Some of the carrier gas flowing inside the upstream projection of probe 11 is diverted away from probe 11. FIG. 2C represents the case in which all the fluid passing through the upstream projection of probe 11, no more and no less, is drawn into probe 11 by sampling system 31. This is isokinetic sampling. Consequently, the linear velocity through probe 11 is the same as through conduit 10, and the percentage of the component products in the sample of the gaseous composition is the same as in conduit 10. If desired, sampling system 31 could be automatically adjusted to compensate for changes in the conditions in conduit 10; for example, sampling system 31 could be adjusted by a servo system responsive to sensors (not shown) located in conduit 10 and probe 11. By sensing the velocity, temperature, and pressure of the fluid in conduit 10 and probe 11, changes in the mass flow rate of the carrier gas through each can be detected, so when the mass velocity through conduit 10 increases, the mass velocity through probe 11 is also increased, and vice versa.

While probe 11 and its conforming supporting sleeve 16 may have any cross-sectional configuration, for ease in fabrication both are preferably circular and probe 11 is of thin wall construction.

In addition to the feature that inlet 12 of probe 11 is far removed from its point of entry into conduit 10 so that minimal fluid disturbance will occur at the point of sampling, another salient feature is that the probe, because of its circularly arcuate configuration, can be readily removed from its supporting sleeve 16 for inspection and cleaning. Once this is accomplished, probe 11 can be reinserted into conduit 10 with correct positioning being insured because of the control provided by sleeve 16 and flange 33.

What is claimed is:

1. Apparatus for sampling the composition of a fluid flowing through a conduit which comprises:
   a. a circularly arcuate hollow probe having a first open end to be disposed outside said conduit for attachment to a fluid sampling means; a second open end to be disposed within said conduit at a substantial distance from the point of entry of said probe into said conduit, at approximately the center line of said conduit and in a plane transverse to the path of fluid flow, said probe having along the circularly arcuate length thereof means to limit the extension of said probe into said conduit;
   b. a circularly arcuate hollow sleeve for closely surrounding and preventing rotation of said probe in said conduit, said sleeve having one end for external attachment to said conduit about the point of entry of said probe into said conduit and a second end to receive said probe in slidable relation, said second end for cooperation with the means on said probe to limit the extension of said probe into said conduit;
   c. means to secure said probe to said sleeve and provide a fluid tight seal at the second end of said sleeve, to prevent leakage between said probe and said sleeve.

2. Apparatus claimed in claim 1, additionally comprising a suction pump connected to the first end of the probe, the suction pump being capable of drawing fluid from the conduit through the probe at a mass velocity equal to the mass velocity of the fluid flowing through the conduit.

3. Apparatus as claimed in claim 1 in which the ratio of the radius of curvature of the probe to the width of the conduit is at least about 5:1.

4. Apparatus as claimed in claim 1 in which the sleeve is connected to the conduit by an external weld joint.

5. Apparatus as claimed in claim 1 in which the second open end of said circularly arcuate probe is positioned substantially coaxial with the center line of said conduit.

6. Apparatus as claimed in claim 1 in which the second open end of said circularly arcuate hollow probe is disposed upstream of the point of entry of the probe into the conduit and with respect to the flow of fluid through said conduit.

* * * * *

UNITED STATES PATENT AND TRADEMARK OFFICE
CERTIFICATE OF CORRECTION

PATENT NO. : 3,921,458
DATED : November 25, 1975
INVENTOR(S) : Forrest E. Logan

It is certified that error appears in the above—identified patent and that said Letters Patent are hereby corrected as shown below:

Column 1, line 18, "which" should read --and--.

Signed and Sealed this twenty-ninth Day of June 1976

[SEAL]

Attest:

RUTH C. MASON
Attesting Officer

C. MARSHALL DANN
Commissioner of Patents and Trademarks